United States Patent Office 2,931,700
Patented Apr. 5, 1960

2,931,700

INHIBITION OF CORROSION OF METALS

Billy D. Oakes, Tulsa, Okla., assignor to The Dow Chemical Company, Midland, Mich., a corporation of Delaware No Drawing. Application August 2, 1957
Serial No. 675,817

4 Claims. (Cl. 21—2.7)

The invention relates to inhibiting corrosion of metals in contact with water and aqueous liquids. More particularly it relates to inhibiting corrosion in pipes and apparatuses through which water passes such as heat exchangers, air conditioners, and water-flooding equipment employed to provide a water drive in oil-producing formations.

Water is perhaps the most widely employed substance as a medium for conveying materials by solution or suspension, for flushing and cleansing, for controlling temperatures, for separating materials by gravity, for diluting to desirable concentrations, for quenching fires, and for providing fluid force in hydraulic lifts and for fluid drives in recovering oil in earth formations. The water thus employed is seldom either of a neutral pH or substantially pure. It usually contains materials in solution or suspension resulting in an aqueous solution, containing a salt, acid, or base, or in an emulsion, slurry, or the like and also most generally contains some organic materials and dissolved gases, e.g., oxygen.

Chemical action, including undesirable chemical action such as corrosion of metal pipes, vessels, pumps, and tanks, is accelerated by the presence of water particularly containing chemically active materials. Metals, therefore, in contact with aqueous liquids or in a moist atmosphere are subjected to continuous corrosive attack. Dissolved oxygen in such liquids has long been known to add to the severity of the corrosive attack.

The rate of attack of aqueous liquids has been retarded by various methods including application of protective coatings, providing anodic protection afforded by certain more electropositive metals in the vicinity of the metal to be protected, and by dissolving in the aqueous liquid certain corrosion inhibitors. The last method is widely employed where aqueous liquids are being stored or transferred.

The corrosion problem presented by aqueous liquids containing appreciable amounts of oxygen has not been satisfactorily solved, particularly where relatively large volumes of water are being forced through underground porous rock or passageways such as in water-flooding operations to provide increased hydraulic pressure in oil-producing formations where the corrosive aqueous liquids eventually contact expensive tubing, casing, pistons, valves, vessels and the like.

There is a need in the use of aqueous liquids, particularly where such liquids contain or are likely to dissolve appreciable amounts of oxygen and thereafter are passed through pumping and transfer systems, for a suitable additament which retards the corrosive effect of such oxygen-containing aqueous liquids.

The principal object of the invention is to provide an aqueous liquid of reduced corrosive tendencies. A further object is to provide a method of treating aqueous metal-contacting liquids to reduce the corrosive properties thereof. A particular object is to inhibit or retard the corrosive tendencies of aqueous solutions which are employed in underground strata or earth formations and which contain dissolved substances, especially oxygen, which initiate and/or aggravate the corrosive tendencies of such aqueous liquids.

The manner by which these objects and related objects are attained will be made clear in the following description and is particularly defined in the claims.

The invention consists essentially of adding sodium nitrite and N-lauroyl sarcosine (N-methyl, N-lauroyl-aminoacetic acid) to water and aqueous solutions to inhibit the corrosive attack thereof on metal with which the water and the solution come in contact.

The ratio of $NaNO_2$ and

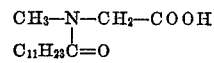

(which may also be called N-lauroyl N-methyl glycine) should be between 1:3 and 3:1 by weight. The preferred ratio is between 1:2 and 2:1 by weight. The concentration of the sodium nitrite and N-lauroyl sarcosine should be between 10 and 500 parts per million each, and preferably a total of at least 75 p.p.m. of the two ingredients added together. A range of between 50 and 100 parts per million of each additament gives the best and most economical results. The temperature of the water or aqueous liquid may be anywhere above the freezing point and below the boiling point. However, a temperature between about 50° and 100° F. gives the best results.

The sodium nitrite and N-lauroyl sarcosine employed in the invention are soluble in water and are readily added thereto by mere addition and mild agitation.

The combined effect of the sodium nitrite and N-lauroyl sarcosine appears to be to sequester certain corrosion-accelerating ions and thereby prevent their entering into reaction with the metals with which the liquid comes in contact.

The corrosive effect on mild steel of water to which neither or only one of sodium nitrite or N-lauroyl sarcosine was added and thereafter aerated were run for comparative purposes. The water employed in these blank runs was tap water which contained the components set out in Table I for which an analysis was run. The water was aerated by bubbling air therethrough.

TABLE I

| Component | Determined as— | Concentration in (p.p.m.) |
|---|---|---|
| Silica | $SiO_2$ | 2.4 |
| Iron and Aluminum | $Fe_2O_3$ | 1.6 |
| Calcium | $Ca^{++}$ | 34.7 |
| Magnesium | $Mg^{++}$ | 2.3 |
| Sodium and Potassium | $Na^+$ | 5.6 |
| Bicarbonate | $HCO_3^-$ | 108.1 |
| Sulfate | $SO_4^-$ | 5.6 |
| Chloride | $Cl^-$ | 10.0 |
| Nitrate | $NO_3^-$ | 1.0 |

The steel employed was A.I.S.I. 1020 panels, 2.75" x 1" x 0.125" in size which were cleansed by immersion in 15 percent hydrochloric acid for 10 minutes at room temperature and then rinsed, in order, in soap and water, a 1 percent NaOH aqueous solution, water, and acetone. The entire rinsing procedure consumed about 1 minute. They were then dried and weighed.

The corrosion of the panels was determined by suspending them vertically submerged in the test solution consisting of the water of Table I only for blank I, or the water of Table I to which the amount of either sodium nitrite or N-lauroyl sarcosine, as set out in blanks 2 to 5 of Table II, had been admixed. The test solution was contained in a flask which was stoppered by a two-hole stopper. A tube, through which air was admitted at a rate of 45 cc. per liter of water or solution per minute, entered one hole and extended to within one inch of the bottom of the flask. A second tube passed out through the second hole and served as a vent for the air leaving the surface of the solution. The test panels were thus submerged for a period of 21 hours in the solution held at 80° F.

At the end of the test period, the test panels were removed from the solution and subjected to the same cleaning, rinsing, and drying procedure to which they were subjected just prior to submergence in the solution in the flask, except the period of submergence in hydrochloric acid was 15 seconds. They were again weighed. The corrosion rate was first calculated according to the formula:

$$\text{Gm./cm.}^2\text{/hr.} = \frac{\text{Total weight loss in grams}}{\text{Panel area in cm.}^2 \times \text{time of test in hr.}}$$

By multiplying the corrosion rate in gm./cm.$^2$/hr. by the factor 49.1, the corrosion rate was converted to lb./ft.$^2$/day. For purposes of comparison, the values thus obtained were multiplied by 1000 and expressed as lb./ft.$^2$/day $\times 10^3$ in Table II.

The corrosion of the panels submerged in the aerated water containing the above components and designated blanks 1 to 5, are set out in Table II.

*Examples 1 to 12*

Water, having the same analysis as that used for the blanks, but to which both sodium nitrite and N-lauroyl sarcosine were added according to the invention, was aerated and used for Examples 1 to 12. For the examples panels of the same type as those used for the blanks were prepared and submerged in the test solutions in the same manner as the blanks.

TABLE II

| Designation | Inhibitor, Concentration, p.p.m. | | Corrosion Rate, Lb./Ft.$^2$/Day $\times 10^3$* |
|---|---|---|---|
| | N-Lauroyl Sarcosine | NaNO$_2$ | |
| Blank 1 | 0 | 0 | 3.00 |
| Blank 2 | 0 | 50 | 0.89 |
| Blank 3 | 0 | 100 | 0.85 |
| Blank 4 | 50 | 0 | 1.51 |
| Blank 5 | 100 | 0 | 0.56 |
| Example 1 | 50 | 25 | 0.48 |
| Example 2 | 30 | 30 | 1.55 |
| Example 3 | 45 | 30 | 0.34 |
| Example 4 | 100 | 33 | 0.10 |
| Example 5 | 35 | 35 | 0.44 |
| Example 6 | 45 | 45 | 0.35 |
| Example 7 | 25 | 50 | 0.45 |
| Example 8 | 50 | 50 | 0.12 |
| Example 9 | 33 | 100 | 0.40 |
| Example 10 | 50 | 100 | <.10 |
| Example 11 | 100 | 100 | <.10 |
| Example 12 | 500 | 500 | <.10 |

*The actual values are therefore $\frac{1}{1000}$ of the values expressed.

The examples of Table II are arranged according to increased amounts of NaNO$_2$ in the test solutions. The results show that marked improvement in corrosion reduction does not occur when the total amount of NaNO$_2$ and N-lauroyl sarcosine is not over 60 p.p.m., as in Example 2, but that marked improvement does occur when a total of 70 p.p.m. as in Example 5, and when a total of 75 p.p.m. as in Examples 3 and 7 are used. Examples 8, 10, and 11 show that an amount between 50 and 100 p.p.m. of each are the preferred amounts to use.

A comparison of a corrosion rate of $3 \times 10^{-3}$ lb./ft.$^2$/day caused by aerated common drinking water, as shown by Example 1, is reduced to less than $0.1 \times 10^{-3}$ lb./ft.$^2$/day by practicing the invention. This is a reduction of over 99 percent in corrosion rate.

The advantages which ensue from the practice of the invention are of high economic significance. Water containing dissolved corrosion-accelerating materials are the cause of large replacement costs and of contaminated containers. This is particularly true in heat-exchanger and refrigeration units and in pumping systems such as used in raising fluids from subterranean formations. The facts that the amount of inhibitor required to show beneficial effects is little more than a trace amount and that the additaments are readily available at reasonable cost make the practice of the invention especially applicable to operations entailing relatively large volumes of water such as in providing a water-drive to produce oil or gas, especially in operation of a unit or multiple field program involving a plurality of wells and a relatively large area.

Having now described the invention, what is claimed and desired to be protected by Letters Patent is:

1. The method of inhibiting the corrosive effect of an aqueous liquid containing dissolved oxygen which comprises dissolving at least 75 parts per million of the combined weights of sodium nitrite and N-lauroyl sarcosine in said solution in the weight ratio of between 1 and 2 of the sodium nitrite to between 2 and 1 of the N-lauroyl sarcosine.

2. An aqueous solution containing an oxidative substance, having dissolved therein to reduce the corrosivity thereof, combined weights of between 75 and 1000 parts of sodium nitrite and N-lauroyl sarcosine per million parts of said aqueous solution in a weight ratio of between 1 and 3 of the sodium nitrite to between 3 and 1 of the N-lauroyl sarcosine.

3. An aqueous solution containing oxygen gas, having dissolved therein to reduce the corrosivity thereof, combined weights of between 100 and 200 parts of sodium nitrite and N-lauroyl sarcosine per million parts of said solution in a weight ratio of between 1 and 2 of the sodium nitrite to between 2 and 1 of the N-lauroyl sarcosine.

4. The method of inhibiting the corrosive effects of an aqueous liquid containing an oxidative substance which comprises adding between 75 and 1000 parts, total combined weights, of sodium nitrite and N-lauroyl sarcosine per million parts of said liquid in the weight ratio of between 1 and 3 of sodium nitrite to between 3 and 1 of the N-lauroyl sarcosine.

References Cited in the file of this patent

UNITED STATES PATENTS

| 2,053,024 | Dreyfus | Sept. 1, 1936 |
| 2,771,417 | Ryznor | Nov. 20, 1956 |
| 2,790,779 | Spivack | Apr. 29, 1957 |

FOREIGN PATENTS

| 635,522 | Germany | Sept. 18, 1936 |
| 895,122 | Germany | July 8, 1949 |

OTHER REFERENCES

Wachter: Ind. and Eng. Chem., August 1945, pp. 749–751.

King et al.: J. of the Electrochemical Soc., February 1954, pp. 79–82.